(12) United States Patent
Wu et al.

(10) Patent No.: US 9,201,279 B2
(45) Date of Patent: Dec. 1, 2015

(54) DISPLAY DEVICE

(71) Applicant: SiPix Technology, Inc., Taoyuan (TW)

(72) Inventors: Yan-Liang Wu, Kaohsiung (TW);
Chi-Mao Hung, Hsinchu (TW);
Wei-Min Sun, Taipei (TW); Pei-Lin Tien, Taichung (TW); Chih-Yuan Hsu, Taipei (TW); Hsiao-Lung Cheng, Taoyuan County (TW)

(73) Assignee: SiPix Technology, Inc., Kueishan, Taoyuan (TW)

( * ) Notice: Subject to any disclaimer, the term of this patent is extended or adjusted under 35 U.S.C. 154(b) by 216 days.

(21) Appl. No.: 14/069,381

(22) Filed: Nov. 1, 2013

(65) Prior Publication Data

US 2014/0118912 A1 May 1, 2014

(30) Foreign Application Priority Data

Nov. 1, 2012 (TW) .............................. 101140492 A

(51) Int. Cl.
*G02F 1/1343* (2006.01)
*G02F 1/1345* (2006.01)

(52) U.S. Cl.
CPC ........ *G02F 1/1345* (2013.01); *G02F 1/134336* (2013.01)

(58) Field of Classification Search
None
See application file for complete search history.

(56) References Cited

U.S. PATENT DOCUMENTS

| 4,999,539 | A | | 3/1991 | Coovert |
| 5,831,709 | A | * | 11/1998 | Song .............................. 349/149 |
| 6,501,528 | B1 | * | 12/2002 | Hamada ........................ 349/158 |
| 2002/0071086 | A1 | * | 6/2002 | Kim et al. ...................... 349/152 |
| 2003/0063080 | A1 | * | 4/2003 | Takahashi et al. ............. 345/211 |
| 2003/0095091 | A1 | * | 5/2003 | Enomoto et al. ................ 345/87 |
| 2008/0204619 | A1 | * | 8/2008 | Saitou et al. .................... 349/43 |
| 2010/0134745 | A1 | * | 6/2010 | Lee et al. ....................... 349/153 |
| 2010/0157180 | A1 | * | 6/2010 | Doane et al. .................... 349/25 |
| 2014/0285462 | A1 | * | 9/2014 | Lee ................................ 345/173 |

FOREIGN PATENT DOCUMENTS

TW 201120554 6/2011

* cited by examiner

*Primary Examiner* — Richard Kim
*Assistant Examiner* — Ryan Crockett
(74) *Attorney, Agent, or Firm* — Winston Hsu; Scott Margo

(57) ABSTRACT

A display device includes an upper substrate, a lower substrate, and a display medium layer. A displaying region, a first bonding region, and a second bonding region are defined in the upper substrate. The first and second boding regions are positioned at two sides of the displaying region. First upper bonding pads and second upper bonding pads are disposed in the first boding region and the second boding region respectively on the bottom surface of the upper substrate. Each first upper boding pad and each second upper boding pad connect with a corresponding odd strip-shaped electrode and a corresponding even strip-shaped electrode in the displaying region respectively. First and second lower bonding pads are disposed on the top surface of the lower substrate, each of which is electrically connected to one corresponding first upper bonding pads or one corresponding second upper bonding pads.

13 Claims, 6 Drawing Sheets

DISPLAY DEVICE

BACKGROUND OF THE INVENTION

1. Field of the Invention

The present invention is related to a display device, and more particularly, to a display device with a good tolerance for aligning bonding pads.

2. Description of the Prior Art

As technology is progressed and information products are popularized, the demand of display device in the market is continuously increased. The substrate of a display device, no mater a flat display device or a flexible display device, has complex display elements and wirings thereon for achieving the purpose of transferring signals to display images.

Generally, a conventional display device has an upper substrate and a lower substrate, and both the two substrates have wirings or display elements with different functions thereon. If the wirings disposed on the upper substrate need to be electrically connected to an external circuit board through the wirings disposed on the lower substrate, an anisotropic conductive film (ACF) may be used for electrically connecting the corresponding bonding pads on the surfaces of the upper and lower substrates respectively, wherein the ACF is located between the upper and the lower substrate. However, when the display technology is kept on being advanced, the scales, such as sizes and spacing, of the wirings and display elements of the display device become more and more minute and small. In this situation, the difficulty of connecting the corresponding bonding pads of the upper and the lower substrates is raised accordingly, which introduces alignment error and low product yield.

SUMMARY OF THE INVENTION

It is therefore one of the objectives of the present invention to provide a display device with a special design of the relative arrangements and shapes of the bonding pads to solve the problem of low product yield caused from the alignment error in the prior art.

According to the present invention, a display device is provided. The display device includes an upper substrate, a lower substrate, a display medium layer, an electrode layer and a conductive layer. The upper substrate has a bottom surface, and the upper substrate includes a display region, a first bonding region and a second bonding region defined thereon. The first bonding region and the second bonding region are disposed at two sides of the display region. The lower substrate is positioned at a lower side of the upper substrate and is in parallel with the upper substrate. The lower substrate has a top surface facing the bottom surface of the upper substrate. The display medium layer is disposed between the upper substrate and the lower substrate in the display region. The electrode layer is disposed on the bottom surface of the upper substrate and includes: a plurality of strip-shaped electrodes, including a plurality of odd strip-shaped electrodes and a plurality of even strip-shaped electrodes arranged in parallel with each other in the display region; a plurality of first upper bonding pads disposed in the first bonding region, each of the first upper bonding pads connects with a corresponding odd strip-shaped electrode; and a plurality of second upper bonding pads disposed in the second bonding region, each of the second upper bonding pads connects with a corresponding even strip-shaped electrode. The conductive layer is disposed on the top surface of the lower substrate, including a plurality of first lower bonding pads and a plurality of second lower bonding pads, wherein each of the first lower bonding pads is electrically connected to a corresponding first upper bonding pad, and each of the second lower bonding pads is electrically connected to a corresponding second upper bonding pad.

It is an advantage that the present invention display device includes the first bonding region and the second bonding region disposed at two sides of the display region respectively, such that both the first and second bonding regions have a larger space for disposing bonding pads with greater sizes. Therefore, the problem of low product yield caused by alignment error can be solved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to the skilled users in the technology of the present invention, preferred embodiments will be detailed as follows. The preferred embodiments of the present invention are illustrated in the accompanying drawings with numbered elements to elaborate on the contents and effects to be achieved.

Figure 1:
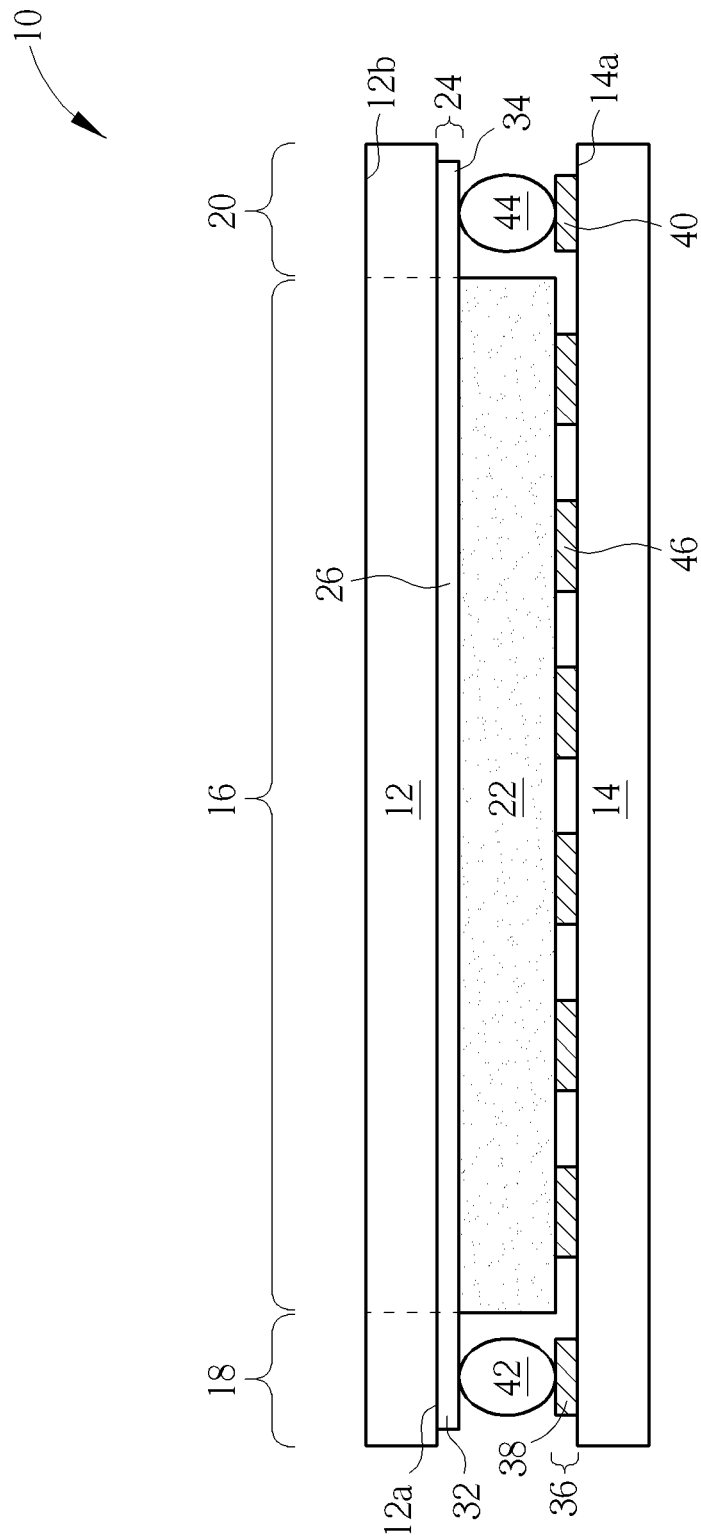
FIG. 1 is a schematic sectional diagram of a display device according to a first embodiment of the present invention.
Figure 2:
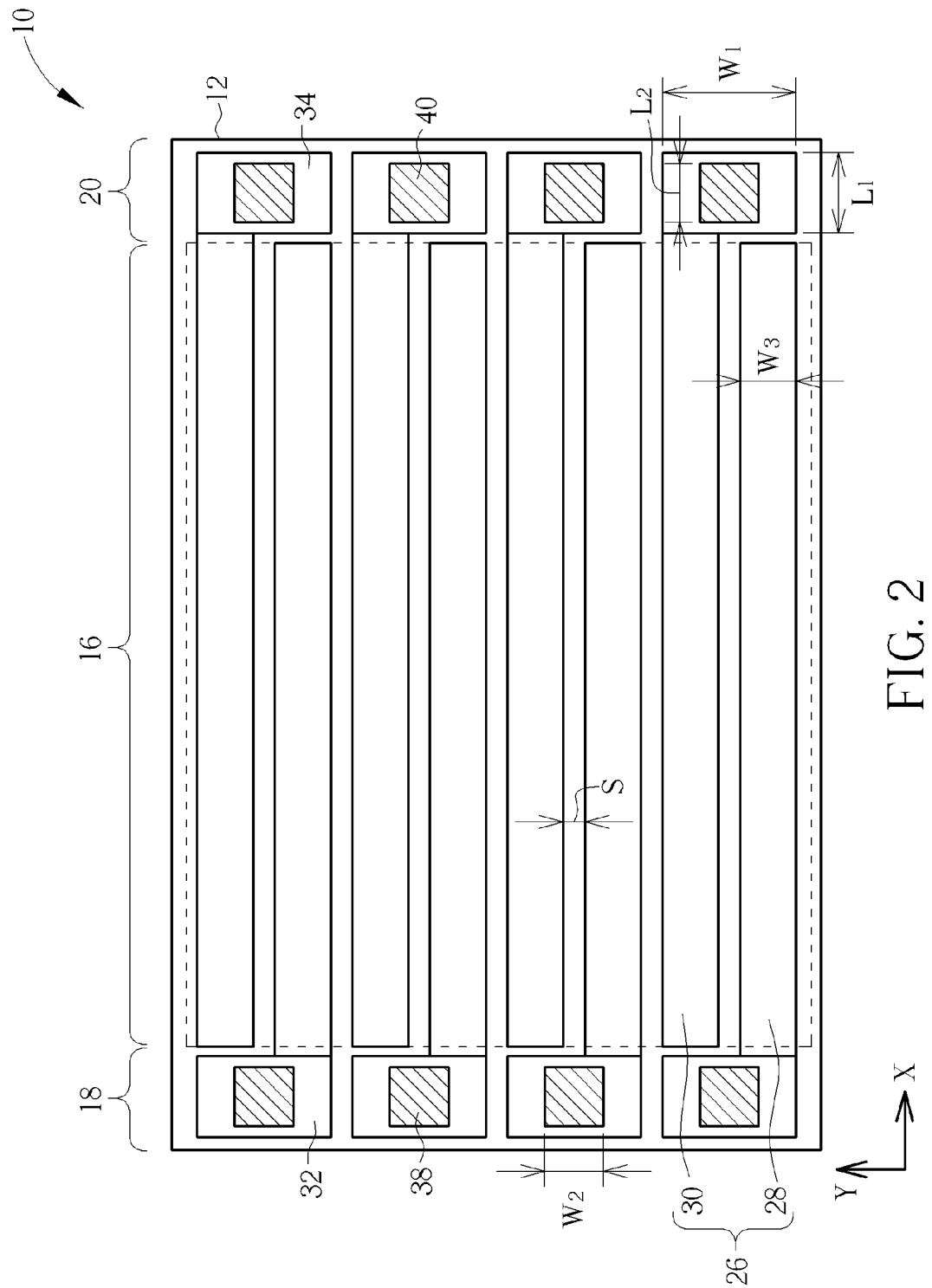
FIG. 2 is a schematic top-view diagram of the display device of the present invention shown in FIG. 1.

Referring to FIG. 1 and FIG. 2, FIG. 1 is a schematic sectional diagram of a display device according to a first embodiment of the present invention, and FIG. 2 is a schematic top-view diagram of the display device of the present invention shown in FIG. 1. In this embodiment, the present invention display device 10 is a flexible display device, such as an electrophoretic display device, but not limited thereto. For example, in various embodiments, the present invention display device 10 may be a flat display device, such as liquid crystal display device or organic light-emitting display device. The display device 10 includes an upper substrate 12 and a lower substrate 14 being in parallel with the upper substrate 12 and disposed at a lower side of the upper substrate 12. The lower substrate 14 has a top surface 14a facing the bottom surface 12a of the upper substrate 12. The top surface 12b of the upper substrate 12 serves as the display side of the present invention display device 10. The upper substrate 12 and the lower substrate 14 may be a flexible substrate individually, such as a polyethylene terephthalate (PET) substrate. A display region 16, a first bonding region 18 and a second bonding region 20 are defined on the upper substrate 12, wherein the first bonding region 18 and the second bonding region 20 are substantially rectangles and are disposed at two different sides of the display region 16, in parallel with or along the direction Y shown in FIG. 2. A display medium layer 22 is disposed between the upper substrate 12 and the lower substrate 14 in the display region 16. The display medium layer 22 maybe an electrophoretic layer or a liquid crystal layer in this embodiment, but not limited thereto.

The display device 10 further includes an electrode layer 24 disposed on the bottom surface 12a of the upper substrate 12. The electrode layer 24 includes a plurality of strip-shaped electrodes 26, a plurality of first upper bonding pads 32 and a plurality of second upper bonding pads 34. Since the top surface 12b of the upper substrate 12 is the display side of this embodiment, the electrode layer 24 is preferably formed with transparent conductive material, such as indium tin oxide (ITO) and indium zinc oxide (IZO), but not limited thereto. The strip-shaped electrodes 26 are disposed in the display region 16, in parallel with each other. The odd strip-shaped electrodes 28 and the even strip-shaped electrodes 30 are defined from bottom to top in FIG. 2. In other words, the first, third, fifth and seventh strip-shaped electrodes 26 from the downside of FIG. 2 are defined as the odd strip-shaped electrodes 28, and the second, fourth, sixth and eighth strip-shaped electrodes 26 from the downside of FIG. 2 are defined as the even strip-shaped electrodes 30. Accordingly, the strip-shaped electrodes 26 include a plurality of odd strip-shaped electrodes 28 and a plurality of even strip-shaped electrodes 30, which are alternately disposed in parallel with each other. The first upper bonding pads 32 are disposed in the first bonding region 18, and each of the first upper bonding pads 32 connects with a corresponding odd strip-shaped electrode 28. Similarly, the second upper bonding pads 34 are disposed in the second bonding region 20, and each of the second upper bonding pads 34 connects with a corresponding even strip-shaped electrode 30. Therefore, the first upper bonding pads 32 and the second upper bonding pads 34 have the same numbers as the odd strip-shaped electrodes 28 and even strip-shaped electrodes 30 respectively.

A conductive layer 36 is disposed on the top surface 14a of the lower substrate 14, which is preferably formed with conductive materials with good conductivity, such as metal conductive materials. The conductive layer 36 includes a plurality of first lower bonding pads 38, a plurality of second lower bonding pads 40 and a plurality of lower-substrate electrodes 46. The first lower bonding pads 38 and the second lower bonding pads 40 are disposed in the first bonding region 18 and the second bonding region 20 respectively, and the lower-substrate electrodes 46 are disposed in the display region 16. Each of the first lower bonding pads 38 corresponds to a first upper bonding pad 32, and each of the second lower bonding pads 40 corresponds to a second upper bonding pad 34. The first lower bonding pads 38 and the second lower bonding pads 40 are electrically connected to the corresponding first upper bonding pads 32 and the second upper bonding pads 34 through anisotropic conductive materials respectively. As shown in FIG. 1, the anisotropic conductive materials may be, but not limited to, ACFs 42, 44 for example. The first lower bonding pads 38 and the second lower bonding pads 40 may be further electrically connected to a printed circuit board (not shown), such that signals maybe transferred to the strip-shaped electrodes 26 from the printed circuit board through the first lower bonding pads 38 and the second lower bonding pads 40, the ACFs 42, 44 and the first and the second upper bonding pads 32, 34.

The sizes, shapes and the relative or corresponding locations between the first lower bonding pads 38 and the first upper bonding pads 32 and between the second lower bonding pads 40 and the second upper bonding pads 34 are shown in FIG. 2. For clearly and simply explaining, only a portion of the conductive layer 36 is illustrated in FIG. 2, i.e. only the first lower bonding pads 38 but the second lower bonding pads 40 are shown but other elements of the conductive layer 36 (such as electrode wirings on the lower substrate) and ACFs 42, 44 are not shown. The strip-shaped electrodes 26 are arranged along the direction X of FIG. 2, substantially perpendicular to the arrangements of the first bonding region 18 and the second bonding region 20. Any two adjacent strip-shaped electrodes 26 have a spacing S. In addition, in the direction substantially perpendicular to the arrangement of the strip-shaped electrodes 26, such as direction Y, the first upper bonding pads 32 and the second upper bonding pads 34 have a first width $W_1$, the first lower bonding pads 38 and the second lower bonding pads 40 have a second width $W_2$, and the ling width of the strip-shaped electrodes 26 are defined as a third width $W_3$. The first width $W_1$ is greater than the second width $W_2$ and the third width $W_3$. According to this embodiment, the second width $W_2$ may be approximately equal to the third width $W_3$, and the first width $W_1$, the second width $W_2$, and the spacing S preferably meet the formula: $W_2<W_1 \leq 2*W_2+S$. In this embodiment, the first upper bonding pads 32 and the second upper bonding pads 34 are rectangles, and the first lower bonding pads 38 and the second lower bonding pads 40 are squares, wherein the length of the sides of the first lower bonding pads 38 and the second lower bonding pads 40 is equal to the second width $W_2$. In addition, the length $L_1$ of the first upper bonding pads 32 and the second upper bonding pads 34 along the direction X may be a little greater than the length $L_2$ of the first lower bonding pads 38 and the second lower bonding pads 40 along the direction X. As a result, both the length and the width of the first lower bonding pads 38 and the second lower bonding pads 40 are less than those of the first upper bonding pads 32 and the second upper bonding pads 34, and the overlapping portions of the projection shadows of the first upper bonding pads 32 and the corresponding first lower bonding pads 38 and the overlapping portions of the projection shadows of the second upper bonding pads 34 and the corresponding second lower bonding pads 40 are squares, which are the patterns or shapes of the first lower bonding pads 38 and the second lower bonding pads 40. Accordingly, when attaching the upper substrate 12 onto the lower substrate 14 in the fabrication process of the display device 10, a greater alignment error can be tolerated because the first upper bonding pads 32 and the second upper bonding pads 34 have greater sizes. Even though the first lower bonding pads 38 and the second lower bonding pads 40 are not aligned with the central portions of the first upper bonding pads 32 and the second upper bonding pads 34 in the attachment process, they can still be electrically connected to the corresponding first upper bonding pads 32 and the second upper bonding pads 34 by the ACFs 42, 44.

The display device of the present invention is not limited by the aforementioned embodiment, and may have other different preferred embodiments and variant embodiments. To simplify the description, the identical components in each of the following embodiments and variant embodiments are marked with identical symbols. For making it easier to compare the difference between the embodiments and variant embodiments, the following description will detail the dissimilarities among different embodiments and variant embodiments and the identical features will not be redundantly described.

Figure 3:
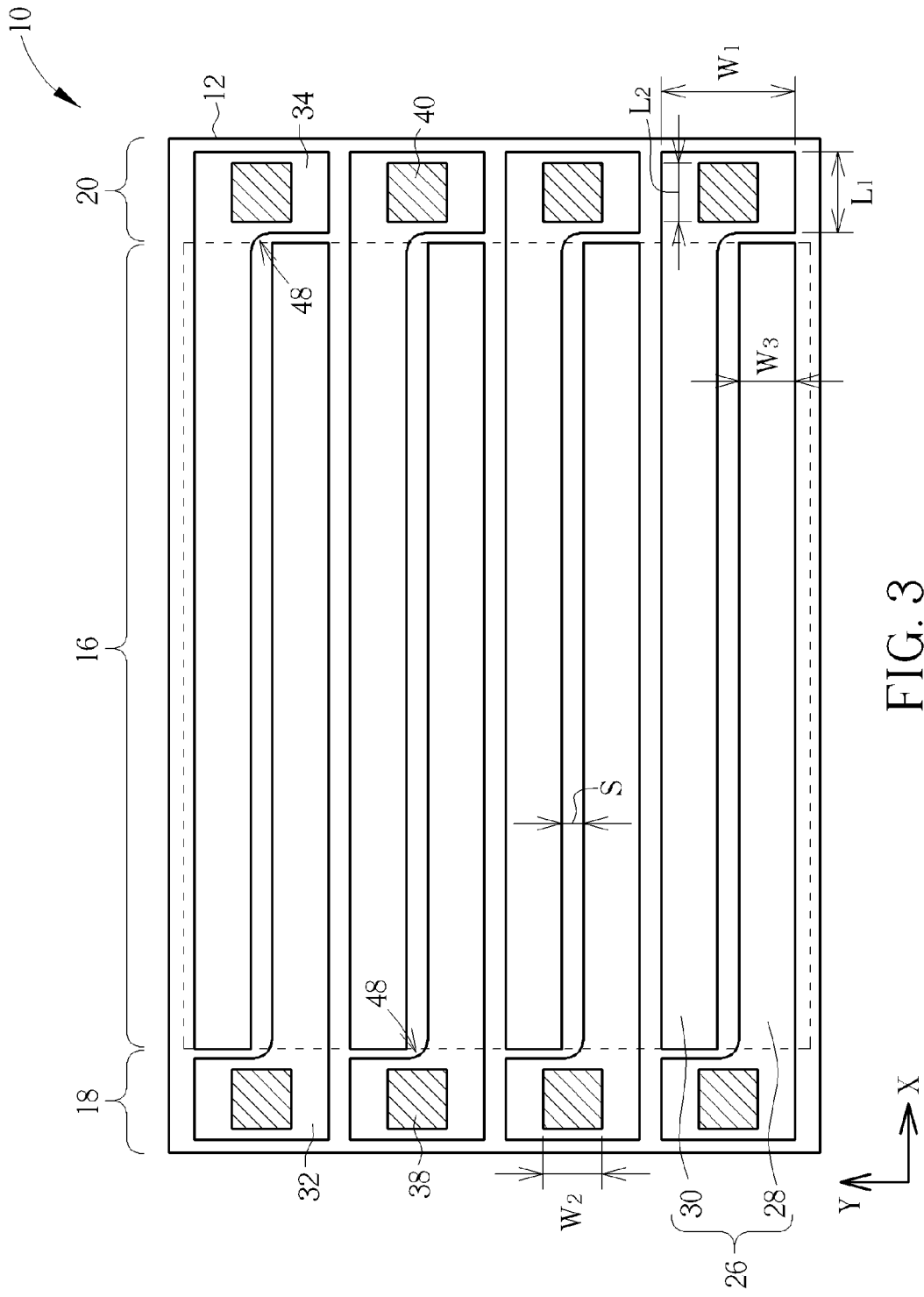
FIG. 3 is a schematic top-view diagram of a display device according to a variant embodiment of the first embodiment of the present invention.

Referring to FIG. 3, FIG. 3 is a schematic top-view diagram of a display device according to a variant embodiment of the first embodiment of the present invention. Different from the first embodiment, the connection parts of the first and second upper bonding pads 32, 34 and the corresponding odd and even strip-shaped electrodes 28, 30 have a rounding corner 48 respectively in this variant embodiment. In this design, the electricity strength of the first and the second upper bonding pads 32, 34 and the odd and even strip-shaped electrodes 28, 30 are enhanced.

Figure 4:
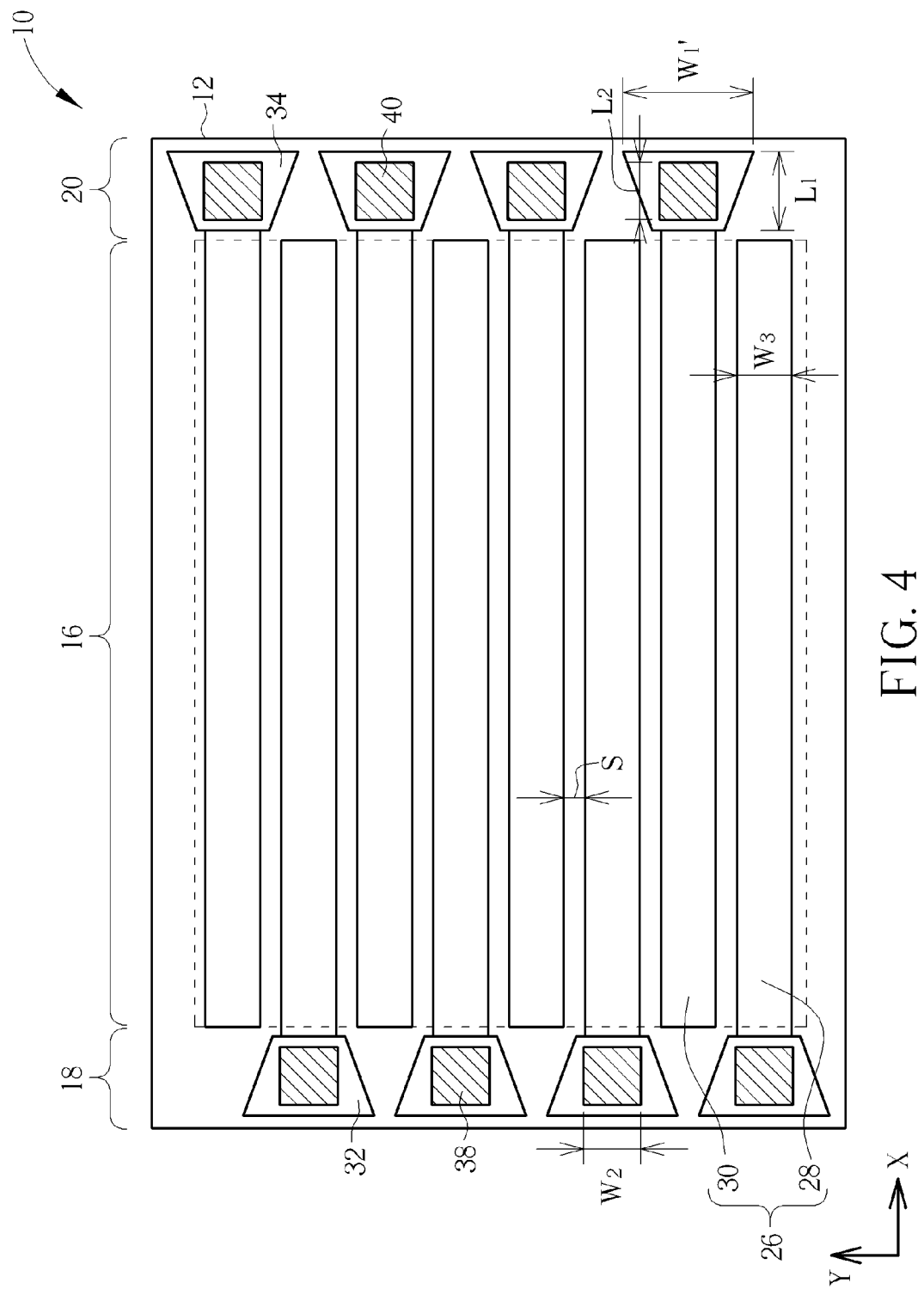
FIG. 4 is a schematic top-view diagram of a display device according to another variant embodiment of the first embodiment of the present invention.

Referring to FIG. 4, FIG. 4 is a schematic top-view diagram of a display device according to another variant embodiment of the first embodiment of the present invention. In this variant embodiment, the first and the second upper bonding pads 32, 34 are trapezoids, which have a maximum width $W_1'$ along the direction Y, while the first lower bonding pads 38 and the second lower bonding pads 40 are still squares. The maximum width $W_1'$ of the first and the second upper bonding pads 32, 34 is respectively greater than the maximum width of their corresponding first or second lower bonding pads 38, 40 along direction Y, the second width $W_2$. Furthermore, the length $L_1$ of the first and the second upper bonding pads 32, 34 along direction X is still greater than the length $L_2$ of the first and the second lower bonding pads 38, 40, such that the overlapping portions of the projection shadows of the first and second upper bonding pads 32, 34 and their corresponding first and second lower bonding pads 38, 40 are squares respectively.

According to the first embodiment and its variant embodiments of the present invention, it is not necessary that the first upper bonding pads and the second upper bonding pads of the display device need to have the same shapes or widths. For example, the first upper bonding pads may be rectangles, the second upper bonding pads may be trapezoids, and the first and second upper bonding pads may have different maximum widths in different variant embodiments. Similarly, according to the present invention, all the first lower bonding pads and the second lower bonding pads are not limited to have the same shapes or widths, provided that the maximum width of each of the first upper bonding pads or the second upper bonding pads is greater than the maximum width of its corresponding first lower bonding pad or second lower bonding pad such that the purpose of raising the tolerance of alignment error along the direction Y can be achieved. In addition, in other variant embodiments, it is also acceptable that only the maximum width of the first upper bonding pads is greater than the maximum width of their corresponding first lower bonding pads while it is not necessary that the maximum width of the second upper bonding pads is greater than the maximum width of their corresponding second lower bonding pads, and vice versa.

Figure 5:
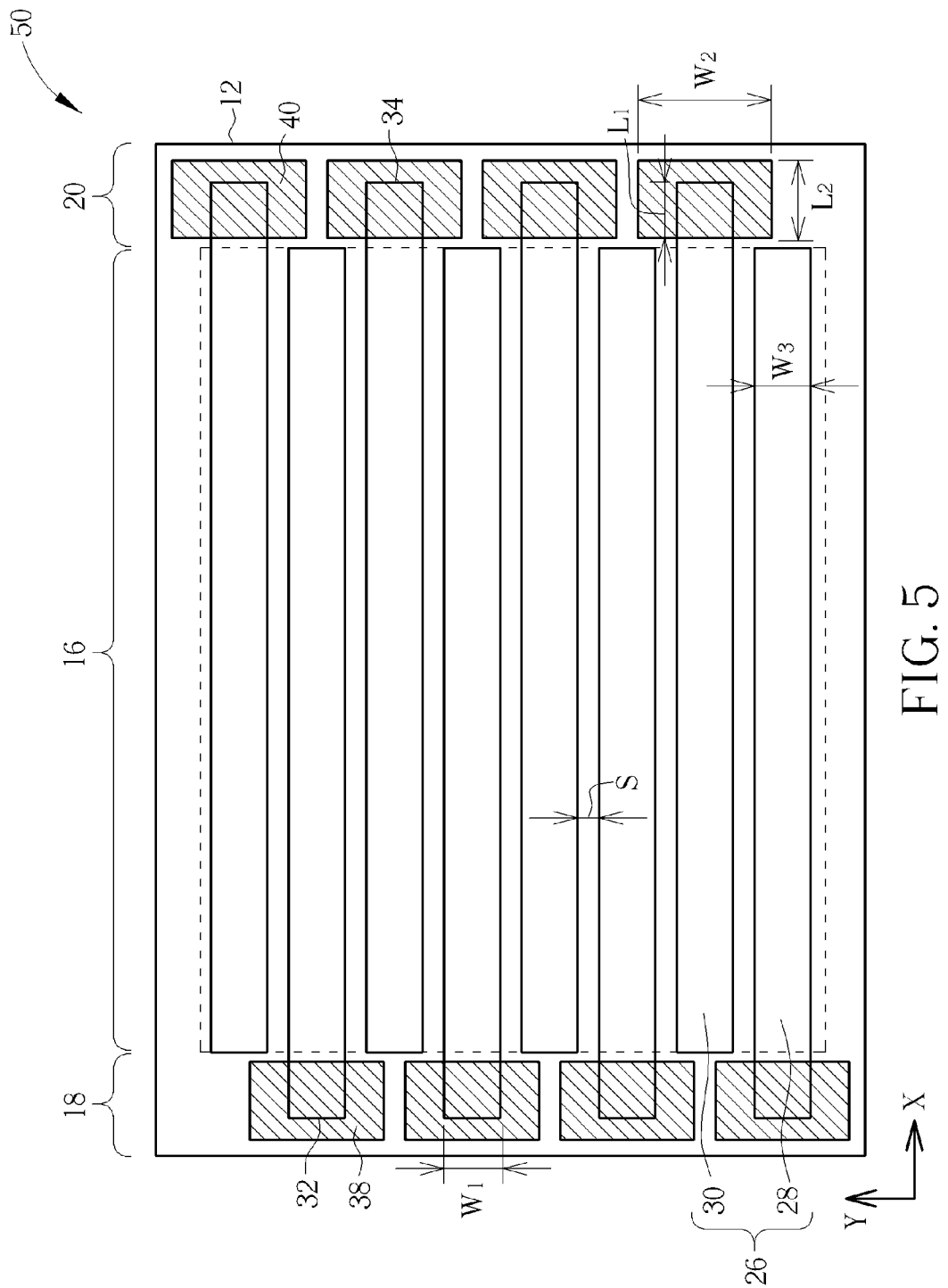
FIG. 5 is a schematic top-view diagram of a display device according to a second embodiment of the present invention.

Referring to FIG. 5, FIG. 5 is a schematic top-view diagram of a display device according to a second embodiment of the present invention. Different from the first embodiment, the sizes of the first lower bonding pads 38 and the second lower bonding pads 40 are greater than those of the first upper bonding pads 32 and the second upper bonding pads 34 in the display device 50 of this embodiment. As shown in FIG. 5, the widths of the first upper bonding pads 32 and the second upper bonding pads 34 may be equal to the width of the strip-shaped electrodes 26 along the direction Y, which means the first width $W_1$ may be equal to the third width $W_3$. As to the electrode layer (the electrode layer 24 shown in FIG. 1), the first upper bonding pads 32 and the second upper bonding pads 34 may be the extensions of the corresponding odd strip-shaped electrodes 28 and the even strip-shaped electrodes 30 respectively. The first upper bonding pads 32 and the second upper bonding pads 34 are squares individually, whose length $L_1$ along the direction X may be equal to the first width $W_1$. Furthermore, the second width $W_2$ of the first lower bonding pads 38 and the second lower bonding pads 40 along the direction Y is greater than the first width $W_1$, and the length $L_2$ of the first lower bonding pads 38 and the second lower bonding pads 40 along the direction X is greater than the length $L_1$ of the first upper bonding pads 32 and the second upper bonding pads 34. Besides, the first lower bonding pads 38 and the second lower bonding pads 40 of this embodiment are rectangles, and the relationship of the first width $W_1$, the second width $W_2$ and the spacing S preferably meets the formula: $W_1 < W_2 \leq 2*W_1 + S$. As a result, the overlapping portions of the projection shadows of the first and the second upper bonding pads 32, 34 and their corresponding first and second lower bonding pads 38, 40 are squares respectively. Since the sizes of the first lower bonding pads 38 and the second lower bonding pads 40 are greater than those of the first upper bonding pads 32 and the second upper bonding pads 34, a greater alignment error when attaching the upper substrate 12 onto the lower substrate 14 can be tolerated. Even though the first and the second upper bonding pads 32, 34 are not aligned with the central portions of the first and the second lower bonding pads 38, 40, the purposes of electrically connecting the first and the second upper bonding pads 32, 34 to the first and the second lower bonding pads 38, 40 through the ACFs 42, 44 can still be achieved.

Figure 6:
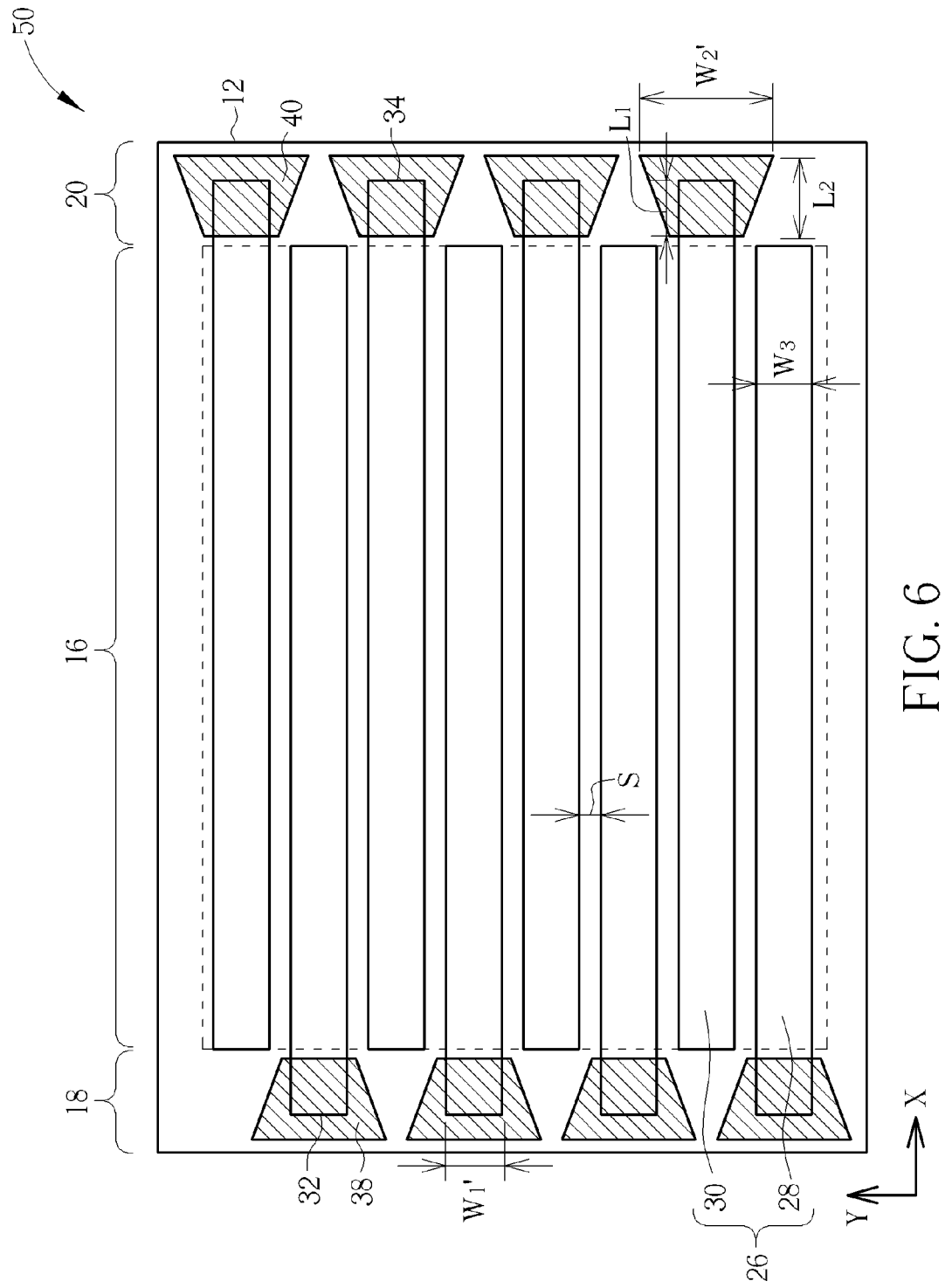
FIG. 6 is a schematic top-view diagram of a display device according to a variant embodiment of the second embodiment of the present invention.

Referring to FIG. 6, FIG. 6 is a schematic top-view diagram of a display device according to a variant embodiment of the second embodiment of the present invention. Different from the second embodiment, the first and the second lower bonding pads 38, 40 of this variant embodiment are trapezoid and have a maximum width $W_2'$ individually. Similarly, the size of each of the first and second lower bonding pads 38, 40 is greater than that of its corresponding first or second upper bonding pad 32, 34. As shown in FIG. FIG. 6, the maximum width $W_2'$ of the first and second lower bonding pads 38, 40 is greater than the maximum width of the first and second upper bonding pads 32, 34, the first width $W_1'$. Accordingly, the overlapping portions of the projection shadows of the first and second upper bonding pads 32, 34 and their corresponding first and second lower bonding pads 38, 40 are squares, which are the patterns or shapes of the first and second upper bonding pads 32, 34.

Similar to the first embodiment, the first upper bonding pads and the second upper bonding pads of the display device in the second embodiment or variant embodiment of the present invention are not limited to have the same shapes or widths, neither do the first lower bonding pads and the second lower bonding pads, provided that the maximum width of each of the first lower bonding pads and the second lower bonding pads is greater than the maximum width of its corresponding first upper bonding pad or corresponding second upper bonding pad for achieving the purpose of raising the alignment error tolerance along the direction Y. In other variant embodiment, it is also acceptable that only the maximum width of the first lower bonding pads is greater than the maximum width of the corresponding first upper bonding pads while it is not necessary that the maximum widths of the second lower bonding pads has to be greater than the maximum width of the second upper bonding pads, and vice versa.

In contrast to the prior art that all the bonding pads on the surfaces of the upper and lower substrates of a conventional display device have the same sizes and shapes, the bonding pads of the present invention display device are disposed at two sides of the display region, and the adjacent upper bonding pads in the same bonding region are corresponding to and electrically connected to only the odd strip-shaped electrodes or only the even strip-shaped electrodes, such that the bonding pads have a greater space for being arranged. By designing the width of one of the upper bonding pads and the lower bonding pads greater than the other one, the alignment error tolerance of the upper and lower bonding pads can be effectively raised. For example, according to the above-mentioned embodiments, the alignment error tolerance can be raise to at least a half of the line width of the strip-shaped electrodes. As a result, the yield of fabricating the display device can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, comprising:
    an upper substrate, having a bottom surface, wherein a display region, a first bonding region and a second bonding region are defined on the upper substrate, and the first bonding region and the second bonding region are disposed at two sides of the display region;
    a lower substrate, being in parallel with the upper substrate and disposed at a lower side of the upper substrate, the lower substrate having a top surface facing the bottom surface of the upper substrate;
    a display medium layer, disposed between the upper substrate and the lower substrate and in the display region;
    an electrode layer, disposed on the bottom surface of the upper substrate, the electrode layer comprising:
        a plurality of strip-shaped electrodes, comprising a plurality of odd strip-shaped electrodes and a plurality of even strip-shaped electrodes, wherein the odd strip-shaped electrodes and the even strip-shaped electrodes are arranged in parallel with each other in the display region;
        a plurality of first upper bonding pads, disposed in the first bonding region, wherein each of the first upper bonding pads connects with a corresponding odd strip-shaped electrode; and
        a plurality of second upper bonding pads, disposed in the second bonding region, wherein each of the second upper bonding pads connects with a corresponding even strip-shaped electrodes; and
    a conductive layer, disposed on the top surface of the lower substrate, the conductive layer comprising:
        a plurality of first lower bonding pads, each of the first lower bonding pads being electrically connected to a corresponding first upper bonding pads; and
        a plurality of second lower bonding pads, each of the second lower bonding pads being electrically connected to a corresponding second upper bonding pad.

2. The display device of claim 1, wherein along a direction substantially perpendicular to an arrangement direction of the strip-shaped electrodes, the first upper bonding pads and the second upper bonding pads have a first width and the first lower bonding pads and the second lower bonding pads have a second width, and the first width is greater than the second width.

3. The display device of claim 2, wherein the strip-shaped electrodes have a third width, the first width is greater than the third width, and the second width is approximately equal to the third width.

4. The display device of claim 2, wherein the first upper bonding pads and the second upper bonding pads are rectangles and the first upper bonding pads and the second lower bonding pads are squares.

5. The display device of claim 1, wherein along a direction substantially perpendicular to an arrangement direction of the strip-shaped electrodes, the first upper bonding pads and the second upper bonding pads have a first width and the first lower bonding pads and the second lower bonding pads have a second width, and the first width is less than the second width.

6. The display device of claim 5, wherein the strip-shaped electrodes have a third width, the second width is greater than the third width, and the first width is approximately equal to the third width.

7. The display device of claim 5, wherein the first lower bonding pads and the second lower bonding pads are rectangles.

8. The display device of claim 7, wherein an overlapping portion of a projection shadow of each of the first upper bonding pads and the corresponding first lower bonding pad is a square, and an overlapping portion of a projection shadow of each of the second upper bonding pads and the corresponding second lower bonding pad is a square.

9. The display device of claim 1, wherein each of the first upper bonding pads and the second upper bonding pads has a rounding corner in a connection part with the corresponding strip-shaped electrode.

10. The display device of claim 1, wherein the first bonding region and the second bonding region are arranged a long a first direction and are disposed at two sides of the display region respectively.

11. The display device of claim 10, wherein the strip-shaped electrodes are arranged along a second direction, and the second direction is substantially perpendicular to the first direction.

12. The display device of claim 1, wherein along a direction substantially perpendicular to an arrangement direction of the strip-shaped electrodes, a maximum width of each of the first upper bonding pads is greater than a maximum width of the corresponding first lower bonding pad, and/or a maximum width of each of the second upper bonding pads is greater than a maximum width of the corresponding second lower bonding pad.

13. The display device of claim 1, wherein along a direction substantially perpendicular to an arrangement direction of the strip-shaped electrodes, a maximum width of each of the first lower bonding pads is greater than a maximum width of the corresponding first upper bonding pad, and/or a maximum width of each of the second lower bonding pads is greater than a maximum width of the corresponding second upper bonding pads.

* * * * *